US011928043B2

(12) United States Patent
Ganesan et al.

(10) Patent No.: US 11,928,043 B2
(45) Date of Patent: Mar. 12, 2024

(54) ADAPTIVE LOG LEVEL CONTROL SYSTEM AND METHOD OF USING THE SAME

(71) Applicant: Dell Products, L.P., Round Rock, TX (US)

(72) Inventors: Indumathi Ganesan, Bangalore (IN); Sreehari Ganesh Tummala, Bangalore (IN); Harshendra Shetty, Bangalore (IN); Shivendra Katiyar, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 242 days.

(21) Appl. No.: 17/491,618

(22) Filed: Oct. 1, 2021

(65) Prior Publication Data

US 2023/0108359 A1    Apr. 6, 2023

(51) Int. Cl.
*G06F 11/07* (2006.01)
*G06F 11/34* (2006.01)
*G06N 20/00* (2019.01)

(52) U.S. Cl.
CPC ...... *G06F 11/3476* (2013.01); *G06F 11/3423* (2013.01); *G06F 11/3438* (2013.01); *G06N 20/00* (2019.01)

(58) Field of Classification Search
CPC ............ G06F 11/3476; G06F 11/3423; G06F 11/3438; G06N 20/00
See application file for complete search history.

(56) References Cited

U.S. PATENT DOCUMENTS

| 10,078,571 B2 * | 9/2018 | Altman | G06F 11/3476 |
| 2009/0157682 A1 * | 6/2009 | Gupta | G06F 11/3466 |
| 2016/0092295 A1 * | 3/2016 | Rajkovic | G06F 11/3476 |
| | | | 714/49 |

* cited by examiner

*Primary Examiner* — Matthew M Kim
*Assistant Examiner* — Kyle Emanuele
(74) *Attorney, Agent, or Firm* — Fogarty LLP

(57) ABSTRACT

Embodiments of systems and methods for adapting a log severity level that is applied to log files associated with a target application based on user interaction. In an illustrative, non-limiting embodiment, an adaptive log level control system includes computer-executable instructions for monitoring user interaction with a target application executed on the IHS, identifying a usage pattern of the user interaction, and determining that the usage pattern is indicative of a problem with the target application. The instructions may then adjust a log severity level of log files associated with the target application according to the detected problem.

20 Claims, 4 Drawing Sheets

ADAPTIVE LOG LEVEL CONTROL SYSTEM AND METHOD OF USING THE SAME

FIELD

The present disclosure relates generally to Information Handling Systems (IHSs), and more particularly, to an adaptive log level control system and method of using the same.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Many software and hardware components generate log messages to facilitate technical support and trouble shooting. Logging generally refers to the generation of log messages and the recording of activity based on those messages. A logging framework may be used in a development environment by developers to debug applications under test. In a logging framework, a logging application or object allows the application under development to log messages generated during execution of that application in the development environment. For example, the application can log a message by passing an object or an exception having a particular severity level to the logging framework. The logging framework can log a message associated with the object or exception which can then be used by the developers to trace execution of the application in an effort to debug the application. Current logging frameworks, such as the Java logging framework for example, are based on a static log level associated with the specific object or exception. For example, these levels can be defined in terms of severity such as "trace," "debug," "info," "warning," "error," and "fatal" to indicate increasing degrees of how serious a message should be considered. These levels are determined by the code developer at design time. The logging framework can be configured by the developer to log those messages generated at or above a particular severity level

SUMMARY

Embodiments of systems and methods for adapting a log severity level that is applied to log files associated with a target application based on user interaction. In an illustrative, non-limiting embodiment, an adaptive log level control system includes computer-executable instructions for monitoring user interaction with a target application executed on the IHS, identifying a usage pattern of the user interaction, and determining that the usage pattern is indicative of a problem with the target application. The instructions may then adjust a log severity level of log files associated with the target application according to the detected problem.

According to another embodiment, a computer-executed method includes the steps of monitoring a user interaction with a target application executed on the IHS, identifying a usage pattern of the user interaction, and determining that the usage pattern is indicative of a problem with the target application. The method further includes the step of adjusting a log severity level of one or more log files associated with the target application according to the detected problem.

According to yet another embodiment, an adaptive log level control system includes computer-executable instructions to monitor a plurality of similar keystroke events that occur within a specified time period with a target application executed on the IHS, identify a usage pattern of the user interaction, and determine that the usage pattern is indicative of a problem with the target application. Using the determined usage pattern, the instructions may adjust a log severity level of one or more log files associated with the target application according to the detected problem by incrementally increasing the log severity level with each additional similar keystroke received, and/or incrementally decreasing the log severity level with each non-similar keystroke received within the specified time period.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
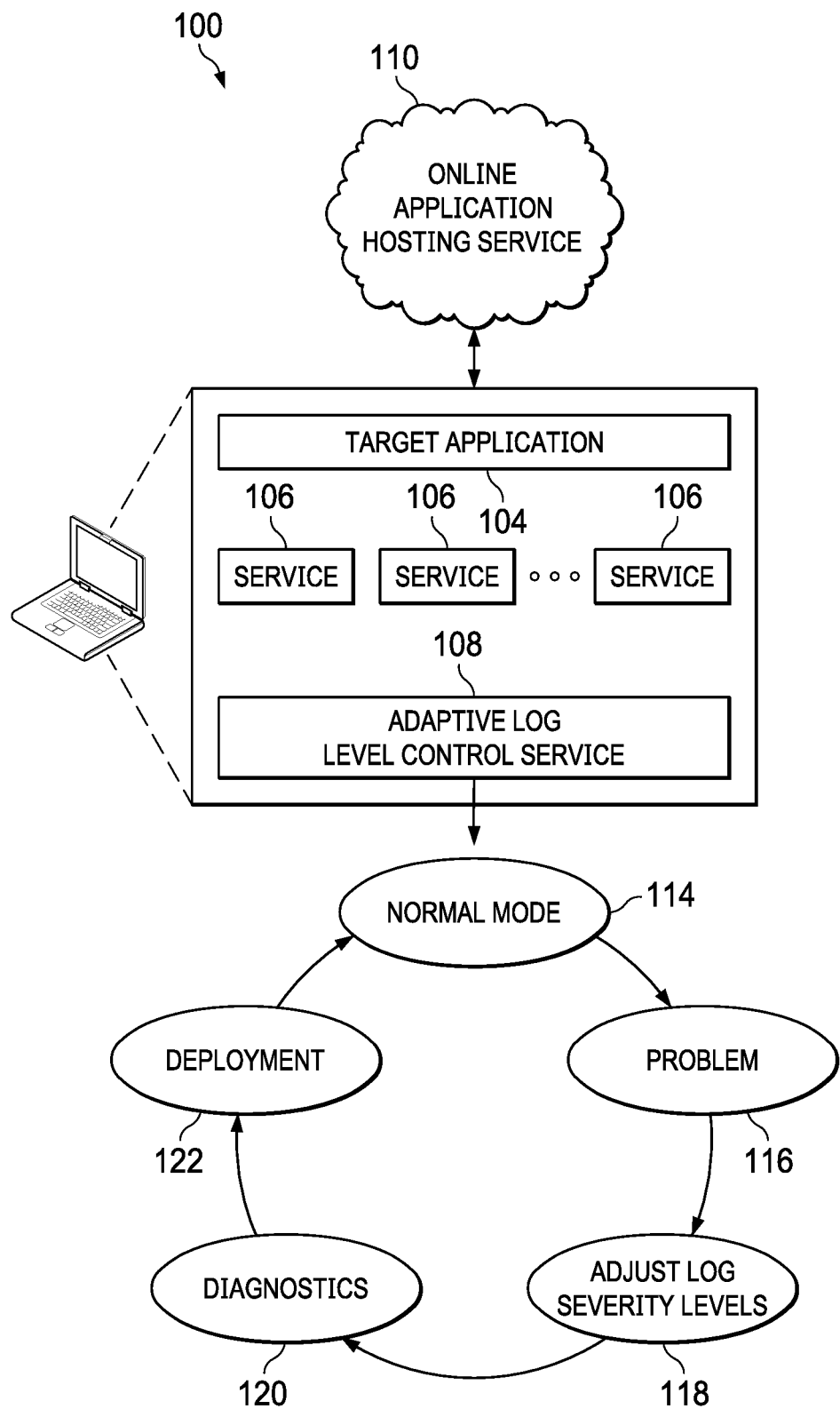
FIG. 1 illustrates an example adaptive log level control system according to one embodiment of the present disclosure.

Embodiments of the present disclosure provide an adaptive log level control system and method for applications in which user interactions with those target applications are continually monitored to determine if a problem exists so that log severity levels can be increased. Whereas conventional implementations of logging systems have been static (e.g., unchangeable during runtime), the amount of information provided was, in many cases, insufficient. Thus, administrators (e.g., operational engineers) of a target application often needed to replicate the failed condition in a laboratory environment to fix the problem. Embodiments of the present disclosure provide a solution to this problem, among others, by providing an adaptive log level control system and method in which the log levels are kept at a minimum when the target application is functioning properly and immediately increasing the log level when a problem is detected by analyzing the user interactions with that target application.

Logging generally refers to the generation of log messages and the recording of activity based on those messages. A log message is typically formed of an alpha-numeric string that includes a date, time, page identifier, and a button identifier. Logging of a target application may be useful in diagnosing its problems or failures. In particular, web-based applications, such as Software as a Service (SaaS) applications, are typically configured to have differing log severity levels (e.g., 'trace,' 'verbose,' 'critical,' 'error,' 'warning,' 'info,' 'debug') based on a risk perception and trade-off with an overall performance of the SaaS application. Nevertheless, the level or amount of logging in a production environment often yields a difficult conundrum. If the log severity level is set too low (e.g., trace, verbose, etc.), the application would generate excessive number of logs using a large amount of disk space and have a potential of adversely affecting application performance. Too much logging may also generate large amounts of data that makes it difficult to extract important diagnostic information when an issue occurs. Additionally, log rotation, which limits the amount of log data by purging the oldest log data, in such a case often would purge valuable data.

If the log severity level is set too high (e.g., error, critical, etc.), the risk of inefficient troubleshooting of problems may be incurred. Such high severity levels often require access to large amounts of supporting material to supplement the lack of useful information that would otherwise have been provided at a lower log severity level. Most applications are configured to log at a high (e.g., notice) severity level in a production environment so that only important log information is retained. In certain cases, however, this log level is not enough to get to the root of many problems that occur. In such situations, support and engineering teams may need to invest time reproducing the issue by reducing the log severity level whether in a local or customer environment. In some cases, the support and engineering teams need to characterize the problem by studying the application code in absence of sufficient logs, which can also be time intensive.

Conventional logging systems have attempted to solve this problem. For example, machine learning (ML) or artificial intelligence (AI) techniques have been implemented to predict system failures using log analysis techniques. The ML/AI techniques, however, generally require a consistent level of logging and a large amount of developer discipline to yield fruitful results. Additionally, such techniques may not be oriented towards creating optimum logs, and in some cases, may lack situational awareness. Thus, a need exists for applications to have the intelligence to decide and ability to adjust the log level in anticipation of problem scenarios. This would result in an optimum level of logging in a production environment without compromising application performance while running smooth, and maintaining enough log depth when the application encounters problems.

FIG. 1 illustrates an example adaptive log level control system 100 according to one embodiment of the present disclosure. The adaptive log level control system 100 includes an Information Handling System (IHS) 102 that is configured with a target application 104, one or more services 106 used to support operation of the target application 104 on the IHS 100, and an adaptive log level control service 108. In one embodiment, the target application 104 is a web-based application where at least a portion of its logic is provided by an online application hosting service 110, although in other embodiments, it is contemplated that the target application 104 may be any suitable application that generates log messages during its operation. As will be described in detail herein below, the adaptive log level control service 108 facilitates an application management lifecycle 112 in which problems, such as failures, alerts, warnings, and the like, incurred by the target application 104 may be remediated by adjusting a log severity level when such problems occur.

The application management lifecycle 112 generally refers to a type of cycle that the target application 104 may undergo as problems are found and fixed at an ongoing basis throughout the serviceable lifecycle of the target application 104. The application management lifecycle 112 may exist in a normal state 114 in that the target application 104 is functioning normally; that is, there exists no known problems with the operation of the target application 104. When a problem 116 is found with the target application 104, the adaptive log level control service 108 may adjust (e.g., decrease) the log severity levels 118 of one or more services 106 provided by the IHS 102 for the target application 104. That is, by decreasing the log severity levels, the resulting log files will have additional, more detailed log information. With the increased level or depth of information provided by the log messages, administrators (e.g., operations engineers) may diagnose the problem with a relatively greater efficiency than would have otherwise been provided without the decreased log severity levels at a diagnostics state 120. Thereafter at the deployment state 122, the administrators may update the target application 104 on the IHS 102 to incorporate its fixed version. Additionally, the log severity levels may be adjusted (e.g., increased). In some cases, the adaptive log level control service 108 may adjust the log severity levels back to those levels that existed before the problem was first detected. At this point, the target application 104 may again be in the normal state 112 in which it is functioning normally with no known problems.

The adaptive log level control service 108 generates log messages with an optimal level of detail by continuously monitoring the user interaction with the target application 104 and analyzing whether user interaction with it matches with a problematic pattern. If the user interaction is indicative of a problem, the adaptive log level control service 108 adjusts the log level to a suitable amount based upon various factors, such as the type of application, operating context of the IHS 102, and the severity of the problem. The application management lifecycle 112 may use any suitable type of user interaction. The user interaction generally refers to any manner in which the user interacts with the target application 104. In one embodiment, the application management lifecycle 112 continually monitors the user interface (e.g., keyboard, mouse, joystick, etc.) for patterns that may indicate that a problem exists with the target application 104. In other embodiments, the application management lifecycle 112 may continually monitor other user interface mechanisms, such as speech recognition, or gesture-based application interfaces to detect the user interactions.

One particular mode of application failure often involves application lockup in which the target application 104 ceases responding to user input. In such a case, the user recognizing that the target application 104 has not responded to a certain keystroke, may perform a second similar keystroke action. If application lockup still occurs, the user may perform several more keystroke actions until they realize that the lockup condition exists. Thus, it may be beneficial to continually monitor the target application 104 for multiple similar keystroke actions that are performed. One example of a similar keystroke action may include pressing the 's' key multiple times. In one embodiment therefore, the adaptive log level control service 108 may continually monitor the keyboard for multiple similar keystroke actions on the same key. In other embodiments, the user interaction may involve pressing a certain control key or a combination of keys. For example, a user interaction may include pressing a control key (e.g., 'F2') or a combination of keys (e.g., 'control'+'alt'+'delete').

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 2:
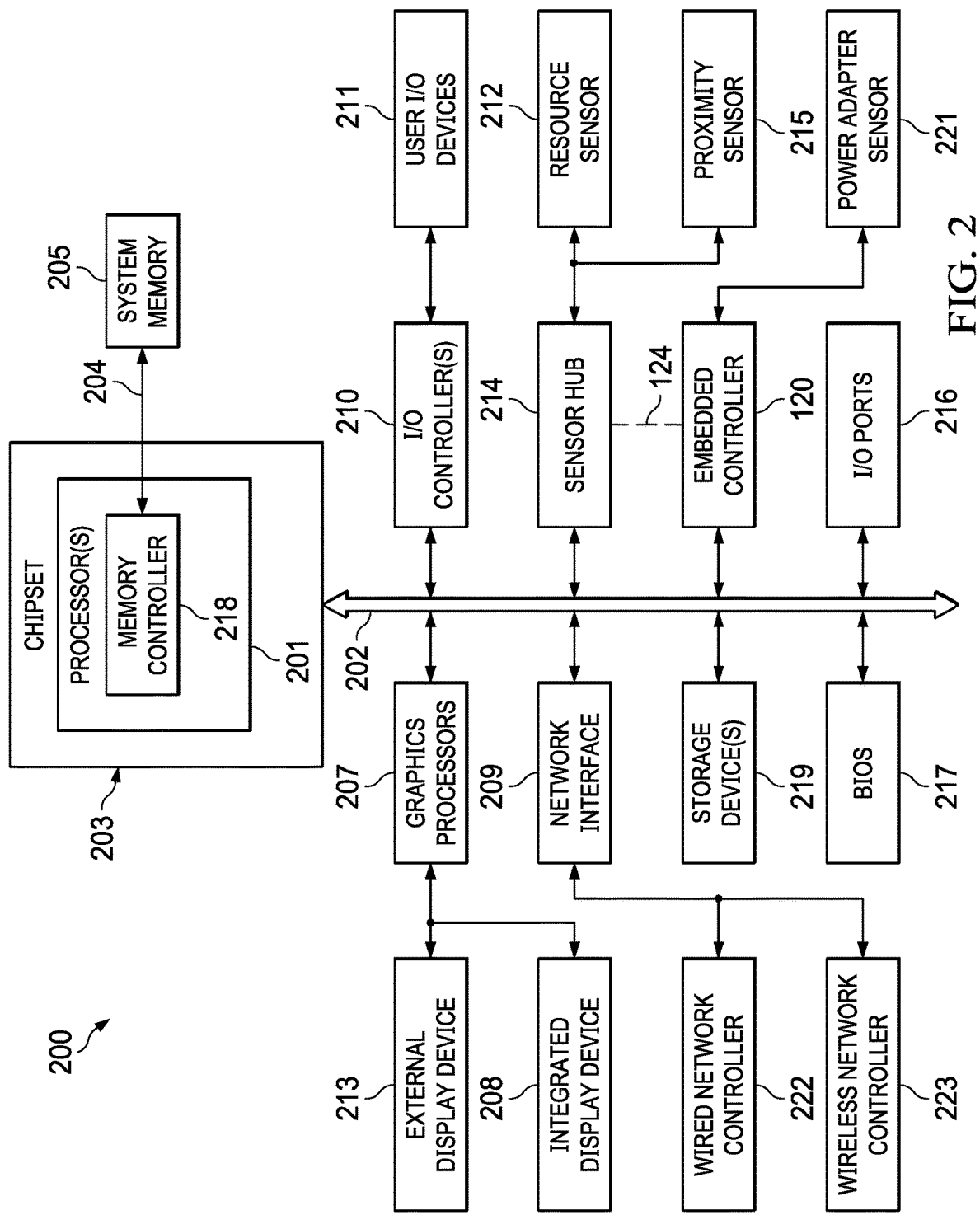
FIG. 2 is a block diagram illustrating components of the IHS configured to implement embodiments of the adaptive log level control system and method according to one embodiment of the present disclosure.

FIG. 2 is a block diagram illustrating components of an IHS 200 configured to implement embodiments of the adaptive log level control system and method according to one embodiment of the present disclosure. IHS 200 may be incorporated in whole, or part, as IHS 102 of FIG. 1. As shown, IHS 200 includes one or more processors 201, such as a Central Processing Unit (CPU), that execute code retrieved from system memory 205. Although IHS 200 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 200 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 200 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 200, bus 202 is illustrated as a single element. Various embodiments may utilize any number of separate buses to provide the illustrated pathways served by bus 202.

In various embodiments, IHS 200 may include one or more I/O ports 216 that may support removable couplings with various types of external devices and systems, including removable couplings with peripheral devices that may be configured for operation by a particular user of IHS 200. For instance, I/O ports 216 may include USB (Universal Serial Bus) ports, by which a variety of external devices may be coupled to IHS 200. In addition to or instead of USB ports, I/O ports 216 may include various types of physical I/O ports that are accessible to a user via the enclosure of the IHS 200.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 200 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 200. User I/O devices 211 may interface with an I/O controller 210 through wired or wireless couplings supported by IHS 200. In some cases, I/O controllers 210 may support configurable operation of supported peripheral devices, such as user I/O devices 211.

As illustrated, a variety of additional resources may be coupled to the processor(s) 201 of the IHS 200 through the chipset 203. For instance, chipset 203 may be coupled to network interface 209 that may support different types of network connectivity. IHS 200 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support different types of network connectivity, such as the network connectivity utilized by IHS 200.

Chipset 203 may also provide access to one or more display device(s) 208 and 213 via graphics processor 207. Graphics processor 207 may be included within a video card, graphics card or within an embedded controller installed within IHS 200. Additionally, or alternatively, graphics processor 207 may be integrated within processor 201, such as a component of a system-on-chip (SoC). Graphics processor 207 may generate display information and provide the generated information to one or more display device(s) 208 and 213, coupled to IHS 200.

One or more display devices 208 and 213 coupled to IHS 200 may utilize LCD, LED, OLED, or other display technologies. Each display device 208 and 213 may be capable of receiving touch inputs such as via a touch controller that may be an embedded component of the display device 208 and 213 or graphics processor 207, or it may be a separate component of IHS 200 accessed via bus 202. In some cases, power to graphics processor 207, integrated display device 208 and/or external display device 213 may be turned off, or configured to operate at minimal power levels, in response to IHS 200 entering a low-power state (e.g., standby).

As illustrated, IHS 200 may support an integrated display device 208, such as a display integrated into a laptop, tablet, 2-in-1 convertible device, or mobile device. IHS 200 may also support use of one or more external display devices 213, such as external monitors that may be coupled to IHS 200 via various types of couplings, such as by connecting a cable from the external display devices 213 to external I/O port 216 of the IHS 200. In certain scenarios, the operation of integrated displays 208 and external displays 213 may be configured for a particular user. For instance, a particular user may prefer specific brightness settings that may vary the display brightness based on time of day and ambient lighting conditions.

Chipset 203 also provides processor 201 with access to one or more storage devices 219. In various embodiments, storage device 219 may be integral to IHS 200 or may be external to IHS 200. In certain embodiments, storage device 219 may be accessed via a storage controller that may be an integrated component of the storage device. Storage device 219 may be implemented using any memory technology allowing IHS 200 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 200 also includes Basic Input/Output System (BIOS) 217 that may be stored in a non-volatile memory accessible by chipset 203 via bus 202. Upon powering or restarting IHS 200, processor(s) 201 may utilize BIOS 217 instructions to initialize and test hardware components coupled to the IHS 200. BIOS 217 instructions may also load an operating system (OS) (e.g., WINDOWS, MACOS, iOS, ANDROID, LINUX, etc.) for use by IHS 200.

BIOS 217 provides an abstraction layer that allows the operating system to interface with the hardware components of the IHS 200. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 200 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 200 (e.g., CPU 201, GPU 207, system memory 205, etc.). In certain embodiments, sensor hub 214 may also include capabilities for determining a location and movement of IHS 200 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 200, absence from IHS 200, and/or distance from IHS 200 (e.g., near-field, mid-field, or far-field).

In certain embodiments, sensor hub 214 may be an independent microcontroller or other logic unit that is coupled to the motherboard of IHS 200. Sensor hub 214 may be a component of an integrated system-on-chip incorporated into processor 201, and it may communicate with chipset 203 via a bus connection such as an Inter-Integrated Circuit ($I^2C$) bus or other suitable type of bus connection. Sensor hub 214 may also utilize an $I^2C$ bus for communicating with various sensors supported by IHS 200.

As illustrated, IHS 200 may utilize embedded controller (EC) 220, which may be a motherboard component of IHS 200 and may include one or more logic units. In certain embodiments, EC 220 may operate from a separate power plane from the main processors 201 and thus the OS operations of IHS 200. Firmware instructions utilized by EC 220 may be used to operate a secure execution system that may include operations for providing various core functions of IHS 200, such as power management, management of operating modes in which IHS 200 may be physically configured and support for certain integrated I/O functions.

EC 220 may also implement operations for interfacing with power adapter sensor 221 in managing power for IHS 200. These operations may be utilized to determine the power status of IHS 200, such as whether IHS 200 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 224.

In various embodiments, IHS 200 may not include each of the components shown in FIG. 2. Additionally, or alternatively, IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
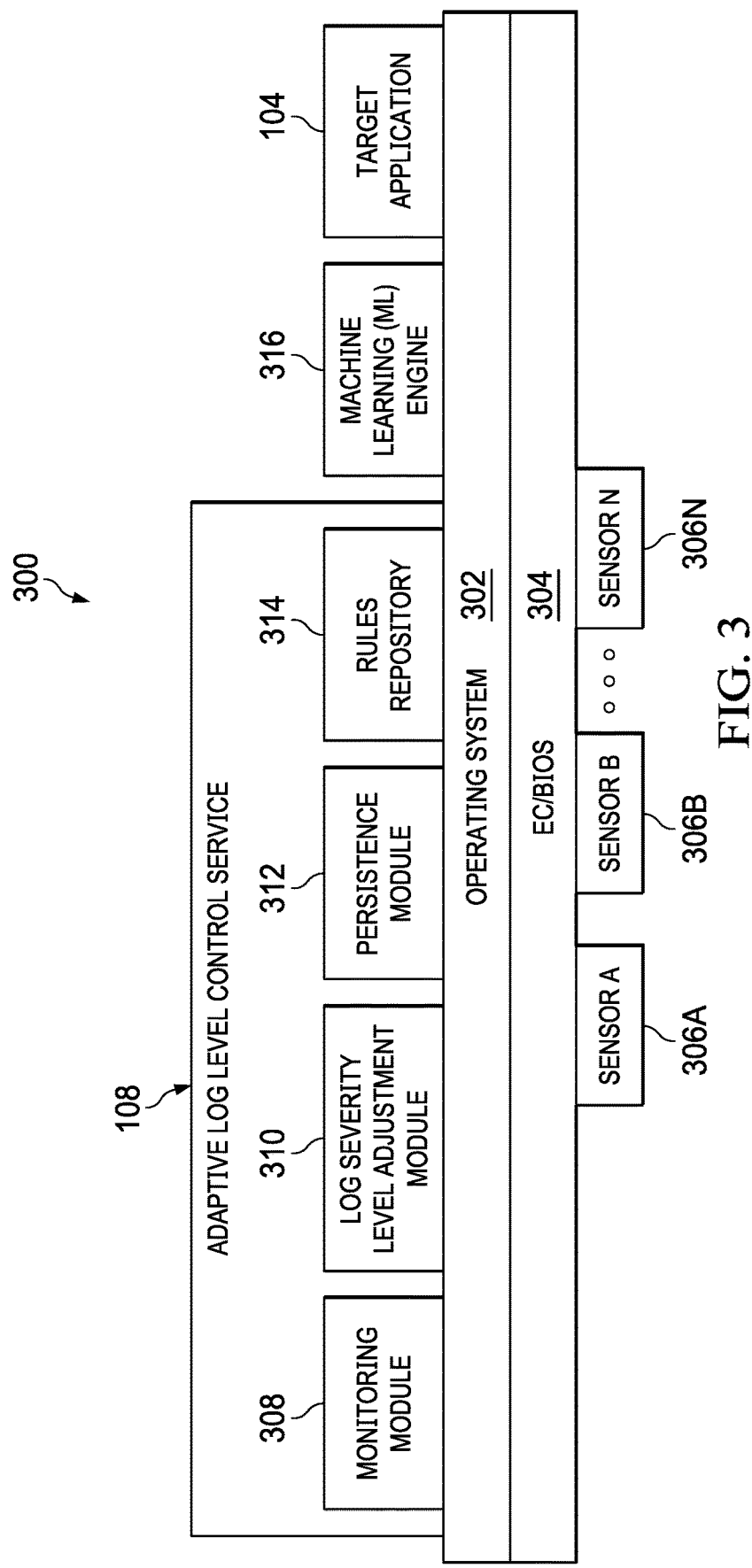
FIG. 3 is a block diagram illustrating an example of software system produced by the IHS for implementing the adaptive log level control system according to one embodiment of the present disclosure.

FIG. 3 is a block diagram illustrating an example of software system 300 produced by IHS 102 (e.g., 200) for implementing the adaptive log level control system according to one embodiment of the present disclosure. In some embodiments, each element of software system 300 may be provided by IHS 102 through the execution of program instructions by one or more logic components (e.g., CPU 201, BIOS 217, EC 220, etc.) stored in memory (e.g., system memory 205), storage device(s) 219, and/or firmware 217. As shown, software system 300 includes an adaptive log level control service 108, a machine learning (ML) engine 316, and a target application 104. The adaptive log level control service 108 is comprised of several modules, namely a monitoring module 308, a log severity level adjustment module 310, a persistence module 312, and a rules repository 314. Although only one target application 104 is shown herein, it should be understood that the adaptive log level control service 108 may be configured to optimize the performance of any number of target applications that may be executed on IHS 102.

Examples of a suitable target application 104 may include web-based applications (SaaS applications), such as word processors, spreadsheets, CAD programs, and the like, as well as locally executed applications, such as media players, web browsers, document processors, email clients, etc.

The adaptive log level control service 108, ML engine 316, and target application 104 are executed by an OS 302, which is turn supported by EC/BIOS instructions/firmware 304.

The monitoring module 308 monitors the user interactions with the target application 104 over a suitable detection channel. For example, EC/BIOS firmware 304 is in communications with, and configured to receive data collected by, one or more sensor modules or drivers $306_A$-$306_N$, which may abstract and/or interface with hardware resource sensor 212 and proximity sensor 215 for detecting the user interaction. In one embodiment, the monitoring module 308 may be configured to detect keyboard input, speech input, as well as gesture input from a user. The monitoring module 308 monitors the user events and acts based on a defined rule set, which in this particular example embodiment, is the rules repository 314. During operation, the monitoring module 308 may read rules from the rules repository 314 and cache the rules. Then based on the user action, the monitoring module 308 will try to identify one or more of the rules to be applied. The resulting log severity level is based on the applied rules. One example rule may include information for if a multiple press of a similar key is detected, change the log severity level to 'critical.' In one embodiment, the monitoring module 308 detects the page and key (e.g., button) using HTML tag attributes and JavaScript events. Nevertheless, it should be appreciated that other detection mechanisms may be used based upon the technology used.

The log severity level adjustment module 310 adjusts the log severity level for the target application 104 in response to input received from the monitoring module 308. That is, the monitoring module 308 uses the log severity level adjustment module 310 to change the application log severity level. In one embodiment, the log severity level adjustment module 310 includes at least a portion of a Spring Boot Framework, which is provided under an open source license from the Bealdung Corporation. Various other methods can also be used based on the technologies involved in the target application 104.

The persistence module 312 is responsible for persisting a user interaction history and respective log severity level adjustments that have been implemented. That is, the persistence module 312 maintains a log of log severity level adjustments that have been made in the past along with the user interaction events that caused the log severity level adjustments to be made. The persistence module 312 can be utilized to review past actions performed by the adaptive log level control service 108 in order to optimize its operation in the future. In one embodiment, the persistence module 312 may persists the user actions, current page of the target application 104 used by the user (e.g., page ID), and the like that are captured by monitoring module. Details of the persisted user actions may include, for example, a date and time of the log severity level change, the current log severity level, the page ID, and the specific user interaction mechanism used (e.g., key). This information can be stored to help developers in tracking any actions taken by the adaptive log level control service 108 for future enhancement.

The rules repository 314 stores a set of rules that define which of the user interaction behaviors could be related to problems. That is, the rules indicate which specific usage patterns that are related to problems with the target application 104. The rules repository 314 maintains a mapping between an interaction pattern and a respective log severity level. These rules can be generated using ML engine 316 and/or generated according to manual input. One example rule may be multiple similar keystroke actions that are performed such as described herein above. Such a rule may also include a time factor. For example, the rule may include multiple similar keystroke actions that occur at or within a specific time period (a keystroke action that occurs three time within 5 seconds with no relatable purpose may cause the adaptive log level control service 108 to adjust the log severity level. Other user interactions that may be indicative of a problem with a target application 104 exist.

The rules stored in the rule repository 314 may help to derive the log severity level based on the user actions and system behavior. Additionally, the rules can be stored in the IHS 102 and consumed by other applications. The rules repository 314 may be packaged along with the target application 104 and can be updated using an online software update procedure (e.g., such as from an online vendor support site) or using a synchronization process.

In one embodiment, ML engine 316 may be incorporated to adapt the operation of the adaptive log level control service 108 according to user habits or other factors that may affect how the adaptive log level control service 108 functions. For example, the adaptive log level control service 108 may include features, or form a part of, the DELL PRECISION OPTIMIZER. In general, the ML engine 316 performs a machine learning process to derive certain performance features associated with the operation of the target application 104 and adaptive log level control service 108. In one embodiment, the ML engine 316 monitors characteristics (e.g., telemetry data, log messages, etc.) of the target application 104 to characterize which user interactions may have occurred shortly before or when the problem began occurring. Once the ML engine 316 has collected a sufficient amount of data over a period of time, it may then process the collected data using statistical descriptors to extract certain characteristics about problems exhibited by the target application 104 and any user interactions at or around the time the problem occurred to infer a relationship between the user interactions and the resulting problem with the target application 104. The ML engine 316 may also gather data from the resources of the IHS 102 to estimate activities performed by the IHS 102 that in combination with the user interactions that may have resulted in the problem.

Additionally, the ML engine 316 may gather an operational context of the underlying IHS 102, such as the execution of certain other applications that may affect the target application 104, actions (e.g., opening a certain type of file, initiating a FTP transfer session, calling another process on the IHS 102 to perform a certain service, etc.) performed and/or a recurring time period of day (e.g., morning, afternoon, evening, etc.), or other user-based behavior in which those actions occur that may be related to certain problems with the target application 104. In a particular example, ML engine 316 may collect data associated with a user that starts the target application 104 each morning at 8:00 am, and with that target application 104 performs file operations that yield a certain level of loading on the storage resource of IHS 102. Later at 8:30 am, the user performs several computational tasks using that target application 104, thus causing the target application 104 to experience a problem. Data that is collected with regard to this behavior may be used by the ML engine 316 to extract those features associated with the target application 104 and any associated user interactions to generate a rule that may be stored in the rules repository 314. The ML engine 316 may use a machine learning algorithm such as, for example, a Bayesian algorithm, a Linear Regression algorithm, a Decision Tree algorithm, a Random Forest algorithm, a Neural Network algorithm, or the like.

Figure 4:
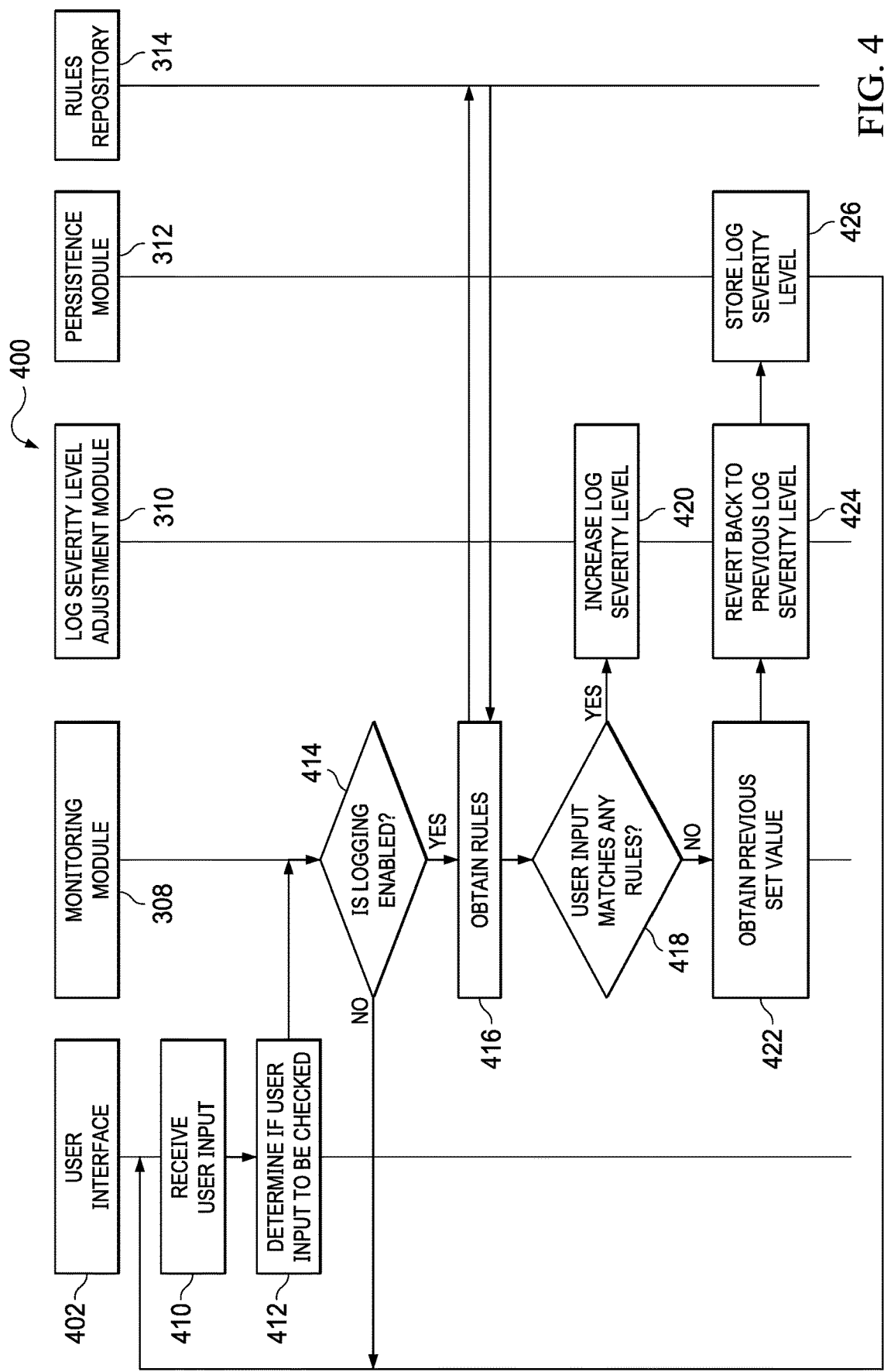
FIG. 4 illustrates an example workflow diagram of a method that may be performed by the adaptive log level control system to adaptively adjust a log severity level according to user interactions with a target application according to one embodiment of the present disclosure.

FIG. 4 illustrates an example workflow diagram of a method 400 that may be performed by system 100 to adaptively adjust a log severity level according to user interactions with a target application 104 according to one embodiment of the present disclosure. Initially, a rules repository 314 may be generated. The rules repository 314 may be included with rules generated according to user input (e.g., manually), and/or they may be generated over a period of time using the ML engine 316. For example, the ML engine 316 may monitor the target application 104, gather data for a predetermined period of time, and use the gathered data to characterize any problems that it exhibits along with any user interactions or IHS characteristics that may have occurred at or around the time when the problems were initially experienced. Additionally, the target application 104 is started on the IHS 102 in which the target application 104 begins logging with its default standard feature definition. In some cases, Often, the log severity level may be specified when the target application 104 is initially launched by passing the desired log severity level as arguments when the target application 104 is initially invoked. For many web-based applications, the available types of log severity levels include the 'trace,' 'verbose,' 'critical,' 'error,' 'warning,' 'info,' 'debug' log severity levels.

At step 410, the user interface 402 receives user input from a user of the target application 104. The user input may be any type of user interaction with the target application 104, such as via keyboard input, mouse input, speech input, gesture input, and the like. Thereafter at step 412, the user interface 402 determines whether the particular user input received is to be checked. In one embodiment, the user interface 402 may be triggered to receive the user input from an event handler that manages user input received from the user interface 402.

At step 414, the monitoring module 308 determines whether logging is enabled for the received user input. If not, processing reverts back to step 410 to poll the user interface 402 for an ensuing user input event. If, however, logging is enabled for the received user input, processing continues at step 416 in which the monitoring module 308 obtains the rules from the rules repository 314. The monitoring module 308 then determines whether any rules exist that match the received user input at step 418. That is, the monitoring module 308 may monitor the user actions and tries to match the received user action with a pattern available in the rule repository 314. If a successful match exists, the monitoring module 308 obtains the specified log severity level associated with the matched rule, and invokes log severity level adjustment module 310 to adjust the log severity level to the level specified in the rule at step 420, and store information associated with the adjusted log severity level at step 426. If, however, no successful match is found, the monitoring module 308 obtains the previous set value of log severity level at step 422, and invokes the log severity level adjustment module 310 to adjust the log severity level back to the previous value at step 424. When the selected log severity level value is stored in the persistence module 312 at step 426, processing reverts back to step 410 to poll the user interface 402 for any ensuing user input for further processing.

Such a case may exist where the rule includes multiple, similar keystrokes user interaction characteristic as described herein above. For example, if the user input involves a first instance of a particular keystroke, the monitoring module 308 may set the log severity level to its default level (e.g., 'error'). But when a second instance of that keystroke is received within a certain timeframe, the monitoring module 308 incrementally increase the log severity level to a higher level (e.g., 'warning'). If a third instance of that keystroke is received with another certain time frame, the monitoring module 308 may further increase the log severity level to an even higher level (e.g., 'debug'). Thus, the monitoring module 308 may be provisioned to incrementally increase the log severity level with each successive similar keystroke to optimally match the likelihood that the target application 104 is indeed experiencing a problem. Conversely, processing one or more non-similar keystrokes entered after a consecutive string of similar keystrokes would have the effect of incrementally decreasing the log severity level, such as one indicative of an intermittent/inconsistent problem. Nevertheless, it should be appreciated that if the monitoring module 308 knows that the target application 104 is currently experiencing a problem, such as via accessing the latest entries in the persistence module 312, it may set the log severity level to a low value regardless of when user input is received via the user interface 402.

Although the method 400 is described in terms of only one rule, it should be appreciated that multiple rules may concurrently be in force. In such situation, the highest log severity level (e.g., most informative) among them will be selected by the monitoring module 308. In one embodiment, the log severity level that is selected by the monitoring module 308 when multiple rules are in effect is a settable parameter. For example, each of the rules stored in the rules repository may be accompanied with a priority tag so that the rule having the highest priority will have its log severity level set by the monitoring module 308. As another example, the monitoring module 308 may include averaging logic to average the log severity levels of multiple rules so that an averaged value of log severity level is set for the target application 104. Other rule selection criteria for selecting a particular log severity level when multiple rules are in effect exist.

The above described method 400 is continually performed as long as the target application 104 is executed on the IHS 102. Nevertheless, when use of the method 400 is no longer needed or desired, the method 400 ends.

Although FIG. 4 describes one example of a process that may be performed by the IHS 102 for adapting a log severity level for a target application 104 based upon user interaction, the features of the disclosed process may be embodied in other specific forms without deviating from the spirit and scope of the present disclosure. For example, the method 400 may perform additional, fewer, or different operations than those operations as described in the present example. As yet another example, the steps of the process described herein may be performed by a computing system other than the IHS 102, such as by an embedded controller, such as EC (BIOS) FIRMWARE 217 as described above with reference to FIG. 2. As yet another example, either of the aforedescribed steps may be performed by modules other than described above, or by different modules as described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An adaptive log level control system comprising: at least one processor; and at least one memory including instructions that, upon execution by at least one processor, cause an Information Handling System (IHS) to: monitor user interaction with a target application executed on the IHS; identify a usage pattern of the user interaction; determine that the usage pattern is indicative of a problem with the target application; and adjust a log severity level of one or more log files associated with the target application from a first log severity level to a second log severity level in response to the problem, wherein the log files are recorded with more detailed information at the second log severity level relative to the information recorded at the first log severity level, wherein the detailed information is configured to improve performance of the target application executed on the IHS.

2. The adaptive log level control system of claim 1, wherein the user interaction comprises a plurality of similar keystroke events that occur within a specified time period.

3. The adaptive log level control system of claim 2, wherein the instructions further cause the IHS to incrementally increase the log severity level with each additional similar keystroke received, and incrementally decrease the log severity level with each non-similar keystroke received within the specified time period.

4. The adaptive log level control system of claim 1, wherein the instructions further cause the IHS to monitor the user interaction via a user interface comprising at least one of a keyboard, a mouse, a joystick, a speech synthesis tool, and a gesture recognition tool.

5. The adaptive log level control system of claim 1, wherein the instructions further cause the IHS to identify the usage pattern according to a rules repository stored in the at least one memory.

6. The adaptive log level control system of claim 5, wherein the instructions further cause the IHS to perform a machine learning (ML) process to generate at least one rule stored in the rules repository.

7. The adaptive log level control system of claim 6, wherein the instructions further cause the IHS to perform the ML process to associate an operating context of the IHS with the user interaction and the indicated problem.

8. The adaptive log level control system of claim 1, wherein the instructions further cause the IHS to adjust a log severity level of one or more services of the IHS, the services being used to support execution of the target application on the IHS.

9. The adaptive log level control system of claim 1, wherein the instructions further cause the IHS to store information associated with the adjusted log severity level in the at least one memory of the IHS.

10. An adaptive log level control method comprising:
monitoring, using instructions stored in at least one memory and executed by at least one processor, a user interaction with a target application executed on an Information Handling System (IHS);
identifying, using the instructions, a usage pattern of the user interaction;
determining, using the instructions, that the usage pattern is indicative of a problem with the target application; and
adjusting, using the instructions, a log severity level of one or more log files associated with the target application from a first log severity level to a second log severity level in response to the problem, wherein the log files are recorded with more detailed information at the second log severity level relative to the information recorded at the first log severity level, wherein the detailed information is configured to improve performance of the target application executed on the IHS.

11. The adaptive log level control method of claim 10, wherein the user interaction comprises a plurality of similar keystroke events that occur with a specified time period, the method further comprising incrementally increasing the log severity level with each additional similar keystroke received, and incrementally decreasing the log severity level with each non-similar keystroke received within the specified time period.

12. The adaptive log level control method of claim 10, further comprising monitoring the user interaction via a user interface comprising at least one of a keyboard, a mouse, a joystick, a speech synthesis tool, and a gesture recognition tool.

13. The adaptive log level control method of claim 10, further comprising identifying the usage pattern according to a rules repository stored in the at least one memory.

14. The adaptive log level control method of claim 13, further comprising performing a machine learning (ML) process to generate at least one rule stored in the rules repository.

15. The adaptive log level control method of claim 14, further comprising performing the ML process to associate an operating context of the IHS with the user interaction and the indicated problem.

16. The adaptive log level control method of claim 10, further comprising adjusting a log severity level of one or more services of the IHS, the services being used to support execution of the target application on the IHS.

17. The adaptive log level control method of claim 10, further comprising storing information associated with the adjusted log severity level in the at least one memory of the IHS.

18. An adaptive log level control system comprising:
at least one processor; and
at least one memory storing instructions that are executed by the at least one processor to:
monitor a plurality of similar keystroke events that occur within a specified time period with a target application executed on an Information Handling System (IHS);
identify a usage pattern associated with the similar keystroke events;
determine that the usage pattern is indicative of a problem with the target application; and
adjust a log severity level of one or more log files associated with the target application according to the problem by:
incrementally increasing the log severity level in response to the problem such that the log files are recorded with more detailed information that is configured to improve performance of the target application executed on the IHS; and
incrementally decreasing the log severity level when the problem is determined to no longer exist.

19. The adaptive log level control system of claim 18, wherein the instructions are further executed to identify the usage pattern according to a rules repository stored in the at least one memory.

20. The adaptive log level control system of claim 19, further comprising performing a machine learning (ML) process to generate at least one rule stored in the rules repository, and associate an operating context of the IHS with the usage pattern and the indicated problem.

* * * * *